US008812602B2

(12) United States Patent
Srikrishna et al.

(10) Patent No.: US 8,812,602 B2
(45) Date of Patent: *Aug. 19, 2014

(54) IDENTIFYING CONVERSATIONS IN A SOCIAL NETWORK SYSTEM HAVING RELEVANCE TO A FIRST FILE

(75) Inventors: Devabhaktuni Srikrishna, San Francisco, CA (US); Marc A. Coram, Stanford, CA (US); Christopher Hogan, San Mateo, CA (US)

(73) Assignee: Python4Fun, Inc., San Mateo, CA (US)

( * ) Notice: Subject to any disclaimer, the term of this patent is extended or adjusted under 35 U.S.C. 154(b) by 87 days.

This patent is subject to a terminal disclaimer.

(21) Appl. No.: 13/438,322

(22) Filed: Apr. 3, 2012

(65) Prior Publication Data

US 2013/0262595 A1 Oct. 3, 2013

(51) Int. Cl.
*G06F 15/16* (2006.01)
(52) U.S. Cl.
USPC .......................................................... 709/206
(58) Field of Classification Search
CPC . H04L 12/586; H04L 12/588; H04L 12/1813; H04L 12/2496; H04L 51/32; H04L 65/4007; H04L 12/585; H04L 65/403; G06F 15/16; G06F 17/30; G06F 17/30023; G06F 17/30522; G06F 17/30654; G06F 17/30684; G06F 17/30722; G06F 17/30867; G06F 17/30887; G06F 17/30893; G06F 1/161
USPC .......................................................... 709/206
See application file for complete search history.

(56) References Cited

U.S. PATENT DOCUMENTS

| 5,752,020 | A | 5/1998 | Ando | |
|---|---|---|---|---|
| 6,327,590 | B1 * | 12/2001 | Chidlovskii et al. | 707/734 |
| 6,981,210 | B2 | 12/2005 | Peters et al. | |
| 7,707,088 | B2 | 4/2010 | Schmelzer | |
| 8,533,232 | B1 | 9/2013 | Hartman et al. | |
| 2004/0117732 | A1 | 6/2004 | McNeill et al. | |
| 2005/0097173 | A1 | 5/2005 | Johns et al. | |
| 2005/0216429 | A1 | 9/2005 | Hertz et al. | |
| 2007/0124379 | A1 * | 5/2007 | Coraluppi et al. | 709/204 |
| 2007/0288455 | A1 * | 12/2007 | Hsu | 707/5 |
| 2008/0109808 | A1 | 5/2008 | Wing et al. | |
| 2008/0263103 | A1 | 10/2008 | McGregor et al. | |

(Continued)

OTHER PUBLICATIONS

Response to Office Action Dated Jul. 16, 2013; U.S. Appl. No. 13/438,251, filed Apr. 3, 2012.

(Continued)

*Primary Examiner* — Kevin Bates
*Assistant Examiner* — Ronak Patel
(74) *Attorney, Agent, or Firm* — Brian R. Short

(57) ABSTRACT

Methods and systems for providing related conversations in a social network system are disclosed. One method includes identifying a plurality of conversations within the social network system, wherein the plurality of conversations each have a relationship with the first file, wherein the social network system provides a platform for storing and sharing conversation, and each conversation includes a conversation and associated information. The method further includes generating, by a system server, a list of inquiries based on the plurality of conversations, providing, by the system server, the list of inquiries to at least one sender of the first file, receiving from the at least one sender at least one response to the list of inquiries, selecting a subset of the plurality of conversations based on the at least one response, and storing information related to the selected subset of the plurality of conversations.

38 Claims, 9 Drawing Sheets

(56) References Cited

U.S. PATENT DOCUMENTS

| | | |
|---|---|---|
| 2009/0265737 A1 | 10/2009 | Issa et al. |
| 2009/0287655 A1 | 11/2009 | Bennett |
| 2009/0292685 A1 | 11/2009 | Liu et al. |
| 2010/0145958 A1* | 6/2010 | Duffy et al. .................. 707/755 |
| 2011/0035674 A1* | 2/2011 | Chenoweth et al. ......... 715/745 |
| 2011/0087658 A1 | 4/2011 | Lunt |
| 2011/0096014 A1* | 4/2011 | Fuyuno et al. ................ 345/173 |
| 2011/0119243 A1 | 5/2011 | Diamond et al. |
| 2011/0161345 A1 | 6/2011 | Dworkin et al. |
| 2011/0231104 A1 | 9/2011 | Lambert |
| 2011/0307491 A1 | 12/2011 | Fisk |
| 2011/0314049 A1 | 12/2011 | Poirer et al. |
| 2012/0066201 A1* | 3/2012 | Suman et al. ................ 707/710 |
| 2012/0078945 A1 | 3/2012 | Hurst |
| 2012/0084629 A1* | 4/2012 | Patrawala et al. ............ 715/205 |
| 2012/0113273 A1 | 5/2012 | Rothschild |
| 2012/0158747 A1 | 6/2012 | Satow et al. |
| 2012/0233152 A1 | 9/2012 | Vanderwende et al. |
| 2013/0218987 A1* | 8/2013 | Chudge et al. ............... 709/206 |

OTHER PUBLICATIONS

Response to Office Action Dated Jun. 27, 2013; U.S. Appl. No. 13/438,266, filed Apr. 3, 2012.

Response to Office Action Dated Jul. 2013; U.S. Appl. No. 13/438,358, filed Apr. 3, 2012.

Response to Office Action Dated Jun. 11, 2013; U.S. Appl. No. 13/438,225, filed Apr. 3, 2012.

* cited by examiner

200

202

Are any of the following updates to World Wide Web relevant to your paper? (i.e. Chronic Obstructive Pulmonary Disease : Effects beyond the Lungs)    208

● Yes, some of them are relevant   204   ◎ No, none of them are relevant   206

Check all that apply – if checked use the text box below them to explain why it is related Microalbuminuria and hypoxemia in patients with chronic obstructive pulmonary disease.(2010 Oct 15 PubMed) Found using ("Celli") AND ("stable patients") - Albert Einstein, Professor of Physics, Princeton University, albert.einstein@princeton.edu, 113 Market St. Princeton, NJ   218

| x | Relevant systemic effect |

Addressing the complexity of chronic obstructive pulmonary disease: from phenotypes and biomarkers to scale-free networks, systems biology, and P4 medicine. (2011 May 1 PubMed) Found using ("celli") AND ("Review obstructive pulmonary")- Oppenheimer, Professor of Physics,  212 oppenheimer@ucberkeley.edu, University of California, 145 Main Street, Berkeley   220

216   Directly Relevant

☐ Involvement of endothelial apoptosis underlying chronic obstructive pulmonary disease-like phenotype in adiponectin-null mice: implications of therapy. (2011 May 1 PubMed)Found ("link between COPD") AND ("systematic inflammation")-William Shockley, Professor of Physics, william.shockley@mit.edu, Massachusetts Institute of Technology, 444 El Camino Real, Cambridge , MA

210

| x | Comparison of biomarkers of subclinical lung injury in obstructive sleep apnea. (2010 Jul 11 PubMed)Found using ("lung-specific biomarker")-Albert Einstein, Professor of Physics, Princeton University, albert.einstein@princeton.edu, 113 Market St. Princeton, NJ

214

☐ The link between periodontal disease and cardiovascular disease: How far we have come in the last two decades? (2010 Jul 11 PubMed)Found using ("link between COPD") AND ("Review  222 obstructive pulmonary")-William Shockley, Professor of Physics, william.shockley@mit.edu, Massachusetts Institute of Technology, 444 El Camino Real, Cambridge , MA

FIGURE 2

IDENTIFYING CONVERSATIONS IN A SOCIAL NETWORK SYSTEM HAVING RELEVANCE TO A FIRST FILE

FIELD OF EMBODIMENTS

The described embodiments relate generally to search results. More particularly, the described embodiments relate to methods, and systems for identifying conversations in a social network system having relevance to a first file . . . .

BACKGROUND

Search engines running on social network systems use a variety of search techniques to present individual messages or conversations to users based on one or more search terms that are provided by the users. The relevance of search results relate closely to the search terms, one or more senders, and date sent. The search engine generally produces a large number of conversations that include some irrelevant results and are difficult to sort for relevant messages or conversations. Many suggested conversations are not relevant to the user. Relevant results are not always provided.

It is desirable to have methods and systems for providing a list of conversations related to the selected conversation relevant to the subject matter of the selected conversation.

SUMMARY

One embodiment includes a method of automatically identifying one or more conversations in a social network system related to a first file. The method includes identifying a plurality of conversations within the social network system, wherein the plurality of conversations each have a relationship with the first file, wherein the social network system provides a platform for storing and sharing conversation, and each conversation includes a conversation and associated information. The method further includes generating, by a system server, a list of inquiries based on the plurality of conversations, providing, by the system server, the list of inquiries to at least one sender of the first file, receiving from the at least one sender at least one response to the list of inquiries, selecting a subset of the plurality of conversations based on the at least one response, and storing information related to the selected subset of the plurality of conversations for access if the first file is selected. Another embodiment includes providing the list of inquiries to more than one sender. In another embodiment, a different list of inquiries is provided to a first sender and other senders. The identified conversations are ranked based on the responses from the senders and a subset of conversations is selected.

Other aspects and advantages of the described embodiments will become apparent from the following detailed description, taken in conjunction with the accompanying drawings, illustrating by way of example the principles of the described embodiments.

BRIEF DESCRIPTION OF DRAWINGS

In the following figures like reference numbers are used to refer to like elements. Although the following figures depict various examples, the one or more implementations are not limited to the examples depicted in the figures.

FIG. 2 shows an example list of inquiries presented to the senders.

DETAILED DESCRIPTION

The described embodiments are embodied in methods, and systems for providing a set of conversations to a user in a social network system, where the set of conversations have relevance to the first file from a search or retrieval of a record identifying the first file.

Figure 1:
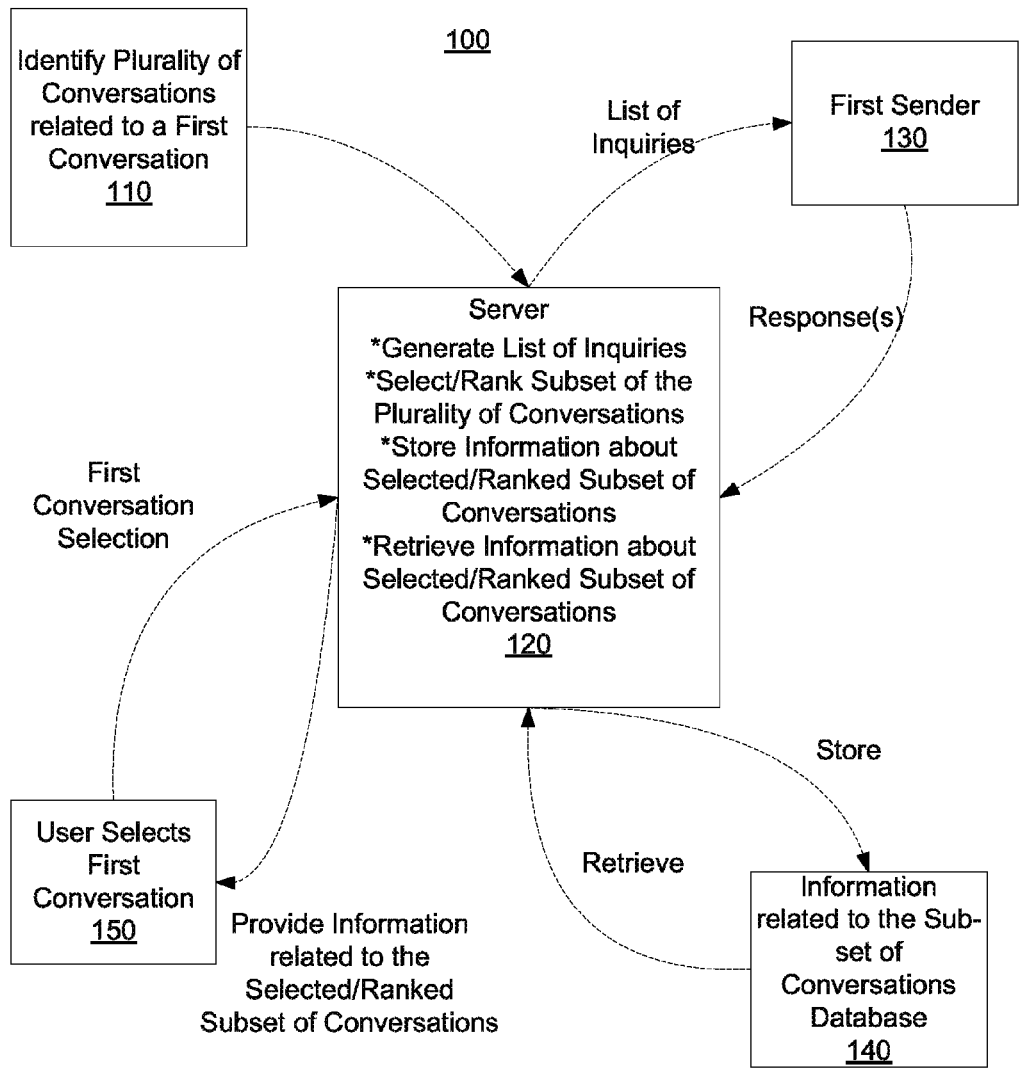
FIG. 1 is a block diagram of an embodiment of a system of providing related conversations from a social network system, where a sender provides input to selecting/ranking a subset of conversations.

FIG. 1 is a block diagram of an embodiment of system 100, a system of providing related conversations from a social network system, where a sender is involved in selecting/ranking a subset of conversations.

For at least some embodiments, the social network system provides a platform for storing and sharing conversation, and each conversation includes a conversation and associated information. For at least one embodiment, the associated information includes at least metadata. The social network service consists of a representation of each user profile and social links. The social network service may provide means for interaction among users via email or instant messaging and provide means for sharing ideas, status, activities, events and interests within a group of users. In the described embodiment, a social network system may store the social network service. In several embodiments, a social network system may be a professional network system such as LinkedIn® or network system in enterprises such as Jive® or Salesforce Chatter®, or social network systems such as Google Groups®, Facebook®. In several embodiments, status update refers to an initial post or change in the status of a user that may be visible to users within a group or users in the social network service. In several embodiments, newsfeed refers to the contents posted by users such as photo tags, friend requests, event updates, group memberships and other activity. Users may reply to content in the newsfeed. In an embodiment, conversation refers to a sequence of status updates and replies in the newsfeed. The conversation may have one or more senders and one or more recipients. In an embodiment, conversations may provide navigation through a group of status updates or replies to newsfeeds. In an embodiment, replying to a conversation sends email to the recipients of the conversation in the newsfeed and may provide additional ability to add more recipients. In an embodiment, users can send conversations and share the conversations in a mailing list. In an embodiment, the shared conversations on mailing lists have viewers or senders. The social network system is accessible among the members of an enterprise or group. The social network system stores conversations and attachments of different formats not limited to pictures, video files, audio files, word document, power point presentations, portable document format (pdf), and spreadsheets. In one embodiment of a social network system, a user may reply to users in a conversation or reply to a select set of users in the conversation. In an embodiment, any user may edit a conversation similar to a wiki. In another embodiment, write privilege to a conversation may be assigned to a certain group of users such as team of senders or a team of people working on a project. In the described embodiments, a first file is a message or a conversation in the social network system, or on the disk drive of the user system, or a conversation on the internet or a message on any other system identified to generate a list of related conversations. The first file may be a recently added conversation to the social network system, or identified due a large number of conversations added to the social network system in the same subject matter, or identified automatically for a periodic update of related conversations, or identified by any other method. It is to be understood that for various embodiments, the first file includes at least one of a web page, a document, an article, a social profile, a message, a message thread, a conversation, a video file, an audio file, or a picture file. It is also to be understood that this is not an exhaustive list.

The social network system is updated constantly as users add conversations to the social network system. As the number of conversations grows large, existence of the conversation may not be known to many users if relevant hyperlinks to other conversations are not created. Creating hyperlinks is a manual task and often few conversations are hyperlinked together in a social network system. Search engines provide access to the conversations that are not hyperlinked.

Unlike machine generated references using an algorithm running on a computer, the judgment of senders in selecting reference conversation is valuable to other readers due to the sender's intrinsic understanding and motivation to identify materials related to the conversation written by that sender. In general, a sender or expert has greater interest and more precise understanding of the subject matter of what they wrote compared to other readers. In the described embodiments, a sender is an original sender, a user who replies to the conversation, a participant, an expert on the subject matter or a team member or anyone who has write-privilege to the first file.

Search engines list related conversations that are published before or after a conversation has been published. When a conversation is selected from the search results, a set of related conversations may be presented by the search engine. The set of related conversations are based on some criteria such as the number of hyperlinks a conversation has, common subject matter, and the frequency of certain phrases. The number of hyperlinks is one of the criteria for search engines to list a conversation at the top of the related conversations. If a conversation has no hyperlinks, the search engine may not list a conversation at the top though the conversation may be relevant. The criteria for suggesting a list of related conversations can be improved by using an expert or sender to recommend the conversations through hyperlinks. The process of semi-automating the presentation of a list of related conversations is described in the embodiments.

A set of conversations related to the first is identified in social network system 110 by server 120. In one embodiment, identifying a conversation in social network system 110 includes server 120 identifying a set of conversations related to the first file and receiving the list of identified conversations. In another embodiment, identifying in social network system 110 includes server 120 receiving the list of identified conversations. The set of identified conversations 110 can be the output of a natural language search, or text analysis, or from collaborative filtering, or any other search technique. The search can be based on a string of words, or a picture or a sender. The set of identified conversations is derived based on a relationship with the first file. The relationship can be any one of or some of sender of the first file, sender of the hyperlinks cited in the first file, frequently used noun phrases, date sent later than the first file, a specific date sent, or a date sent after a specific date. Replies to content in the newsfeed from a sender tend to have common subject matter. Frequently used noun-phrases in the first file are also keywords for searching related conversations. However, noun phrases in social network conversations may change with technology or over a period of time. Many search engines may not have the intelligence to recognize the changing noun phrases over a period. In some embodiments, the full-text of the conversation is used for searching to yield more relevant related conversations. Conversations with date sent later than the first file are valuable as users are generally interested in recent updates.

In an example, a search engine operating on server 120 uses the Facebook Graph® API to identify related conversations in Facebook®, based on noun phrases in full-text. Facebook Graph® API is a powerful application-programming interface that allows users to access and search conversations in the Facebook Newsfeed®. The algorithm used to generate the search terms automatically extracts noun phrases from a conversation using natural language processing tools and ranks them by the number of occurrences in the conversation text compared to the number of occurrences on the web.

Server 120 generates a list of inquiries based on the set of conversations related to the first file. In an embodiment, the list of inquiries includes questions asking the sender whether the conversations are relevant to the first file, and the search terms used in keyword search or noun-phrase used to select the conversation.

FIG. 2 shows example 200, an inquiry generated using keyword search by Facebook Graph® API in Facebook®. Selection of keyword search results displays related conversations. Example 200 shows the related conversations from keyword searches. In example 200, 202 is the subject of the first file. The first question summarizes the inquiry about relevant conversations. 204 is a check box next to a related conversation selected by a search engine. 206 is the date sent of the related conversation. 208 is the search term used to identify the related conversation. 210 is an input box for the sender to enter the reason for the conversation being relevant, 212 shows the author who selected the profile as relevant. 214 shows the institution of the author. 216 shows the relationship tag, 218 shows the email address of the author, 220 shows the address and 222 shows the affiliation of the author. In one embodiment, the identity of the senders who selected each message thread is revealed to the user by displaying metadata such as the sender's name, address, or contact information.

For an embodiment referring back to FIG. 1, a first sender 130 is notified of the list of inquiries generated by server 120.

In the described embodiments, a first sender is the sender of the first file, an expert on the subject matter or a team member or anyone who has write-privilege to the first file. In the described embodiments, the notification can be sent electronically. In an embodiment, the notification email contains a hyperlink to a webpage that contains the list of inquiries. In another embodiment, the email contains the text of the inquiries. In another embodiment, the notification is sent by an email or message on a social network such as Facebook® or instant message system. In another embodiment, the notification is sent from a web-based interface such as Jive®, or LinkedIn® or Google Docs®. The sender completes the inquiry by selecting one or more conversations related to the first file in the opinion of the sender, and sends the response to the server using any of the notification methods described above. Server 120 receives the response to the inquiry from the sender and processes the response. The response includes a selection of conversations related to the first file. In an embodiment, the response includes a ranked list of the related conversations, identifying the relevance of the related conversations to the first file. In an embodiment, the sender includes the relationship of one or more conversations such as whether the conversation complements the first file, or summarizes the first file or contradicts the first file.

In an embodiment, conversations selected by the sender are ranked higher than the conversations not selected by the sender. A subset of the ranked conversations is selected. In another embodiment, all conversations selected by the sender 130 are selected. In another embodiment, a certain number of ranked conversations are selected. Server 120 creates a hyperlink between the first file and the subset of selected/ranked conversations in the social network system. The hyperlink influences future search results of the engine when the first file or any of the subset of conversations is involved. Server 120 stores information about the subset of related conversations in a storage system 140. The information includes one or more of hyperlinks to the related conversations, ranking of the conversations, the sender of the first file, and metadata of the conversations. In the described embodiments, hyperlinks are references to conversations that connect the users to another conversation or a portion of the conversation. In another embodiment, storage system 140 is a separate storage system. When a user selects the conversation identifier from search results or any other listing server 120, retrieves information about the selected/ranked related conversations. In an embodiment, the user is presented with a list of information about the related conversations shown in FIG. 2. In one embodiment, the identity of the senders who selected each conversation is revealed to the user by displaying meta-data such as the sender's name, qualifications, institution, affiliation, address, or contact information.

Figure 3:
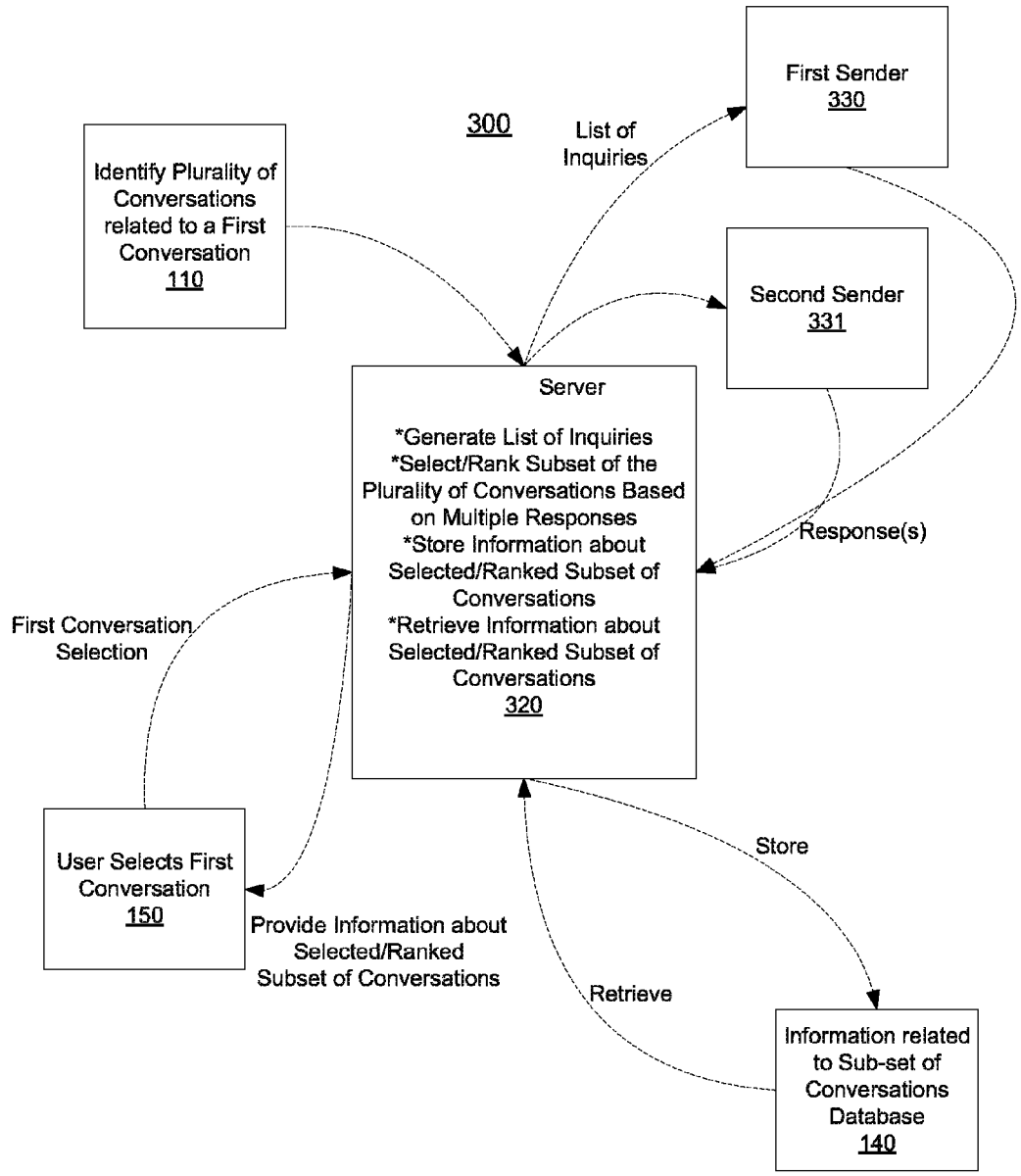
FIG. 3 is a block diagram of an embodiment of a system of providing related conversations, where more than one sender provides input to selecting/ranking a subset of conversations.

FIG. 3 is a block diagram of an embodiment of system 300, a system of providing related conversations, where more than one sender provides input to selecting/ranking a subset of conversations. A set of conversations related to the first file 110 is identified in social network system by server 320. The set of conversations is derived based on a relationship such as sender, frequently use noun-phrases, and common subject matter with the first file. Server 320 generates a list of inquiries based on the set of conversations related to the first file. In an embodiment, the list of inquiries includes questions asking the senders whether the related conversations are relevant to the first file as determined by the search engine.

The list of inquiries generated by server 320 is notified to the first sender 330. The list of inquiries is also notified to second senders 331. In the described embodiments, the second sender is one or more senders other than the first sender.

The first and second senders are notified electronically as described in conjunction with FIG. 1. Server 320 receives responses from the first sender as well as the second senders. The response includes a selection of conversations related to the first file. In an embodiment, the response includes a ranked list of the related conversations, identifying the relevance of the related conversations to the first file. In an embodiment, conversations are ranked based on the number of selections from the first and the second senders. In an embodiment, the conversations selected by the first sender are ranked higher than the conversations selected by second senders. In another embodiment, all responses are ranked with the same weight. In another embodiment, a certain number of ranked conversations are selected. In another embodiment, all conversations selected by the first sender and the second senders are selected.

Information about the selected/ranked conversations is stored in storage system 140. User selection of the first file identifier 150 from search results or any other listing is sent to server 320. Server 320 retrieves information about the selected/ranked list of related conversations from the social network system before presenting to the user. In one embodiment, the identity of the senders who selected each conversation is revealed to the user by displaying meta-data such as the sender's name, qualifications, institution, affiliation, address, or contact information.

Figure 4:
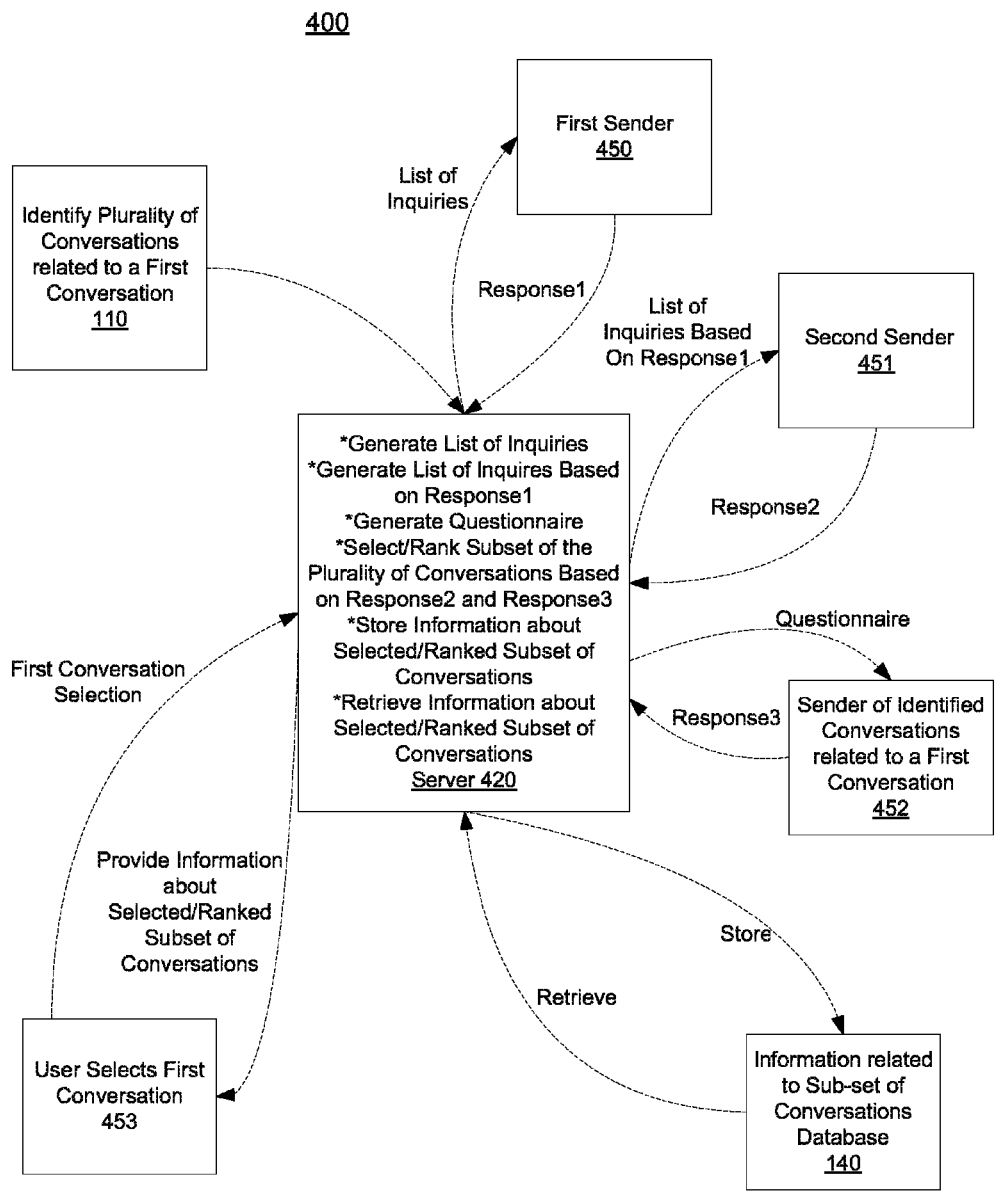
FIG. 4 is a block diagram of an embodiment of a system of providing related conversations in a social network system, where more than one sender is involved in the selecting/ranking a subset of conversations and more than one list of inquiries is generated.

FIG. 4 is a block diagram of an embodiment of system 400, a system of providing related conversations, where more than one sender provides input to selecting/ranking a subset of conversations and more than one list of inquiries is generated. One or more conversations related to a first file are identified in a social network system (similar to the description in conjunction with FIG. 1). A list of inquiries is generated by server 420 based on the conversations related to the first file. The list of inquiries includes questions asking the relevance of the related conversation to the first file. The list of inquiries is notified to a first sender 450. A first response is received from first sender 450 by server 420. The first response includes selection of conversations that are related to the first file in the opinion of the first sender 450. It a embodiment, the first response includes a ranked list of the related conversations, identifying the relevance of the related conversations to the first file. A second list of inquiries is generated based on the first response. The second list of inquiries includes questions about the selection of the conversations related to the first file by the first sender. In an embodiment, the second list of inquiries includes the related conversations and the search terms used to identify the related conversations or the noun-phrases used to identify the conversations.

Second senders 451 are notified electronically (by methods discussed in conjunction with FIG. 1) with the second list of inquiries. Server 420 receives the second response from second senders and analyzes the second response. The second response further refines the machine generated search results. The second response includes a selection of conversations related to the first file. In an embodiment, the second response includes a ranked list of the related conversations, identifying the relevance of the related conversations to the first file. Server 420 ranks a related conversation based on the number of selections from second senders. A subset of the ranked related conversations is selected.

In an embodiment, server 420 generates a questionnaire based on identified conversations related to the first file 110. The questionnaire includes the opinion of one or more senders of the identified conversations about the selection as a related conversation to the first file. The questionnaire is notified to the senders of identified conversations 452. Server 420 receives response3 from the senders of identified conversations 452. In an embodiment, server 420 ranks an identified conversation based on the number of selections from second senders 451 and the selection from the sender of identified conversations 452. A subset of the ranked related conversations is selected.

In an embodiment, all conversations selected by second senders are selected. In another embodiment, related conversations receiving a certain rank are selected. Information related to the ranked and first file is stored in storage system 140. In an embodiment, the information related to the selected/ranked conversations includes one or more of hyperlinks to the selected conversations, the sender of the selected conversation, the title of the selected conversation, the senders, the opinion of the sender of the selected conversation, opinion of the senders of the first file, sender's name, qualifications, institution, affiliation, address, or contact information, the published date, and the selection/rank date. When a user selects the first file identifier 453, server 420 retrieves the information related to the selected related conversations from storage system 140. In an embodiment, information related to the subset of selected/ranked conversations is presented to the user shown in FIG. 2. In one embodiment, the identity of the senders who selected each conversation is presented to the user by displaying meta-data such as the sender's name, qualifications, institution, affiliation, address, and contact information. In another embodiment, information about the opinion of the sender of the selected conversation is presented to the user.

Figure 5:
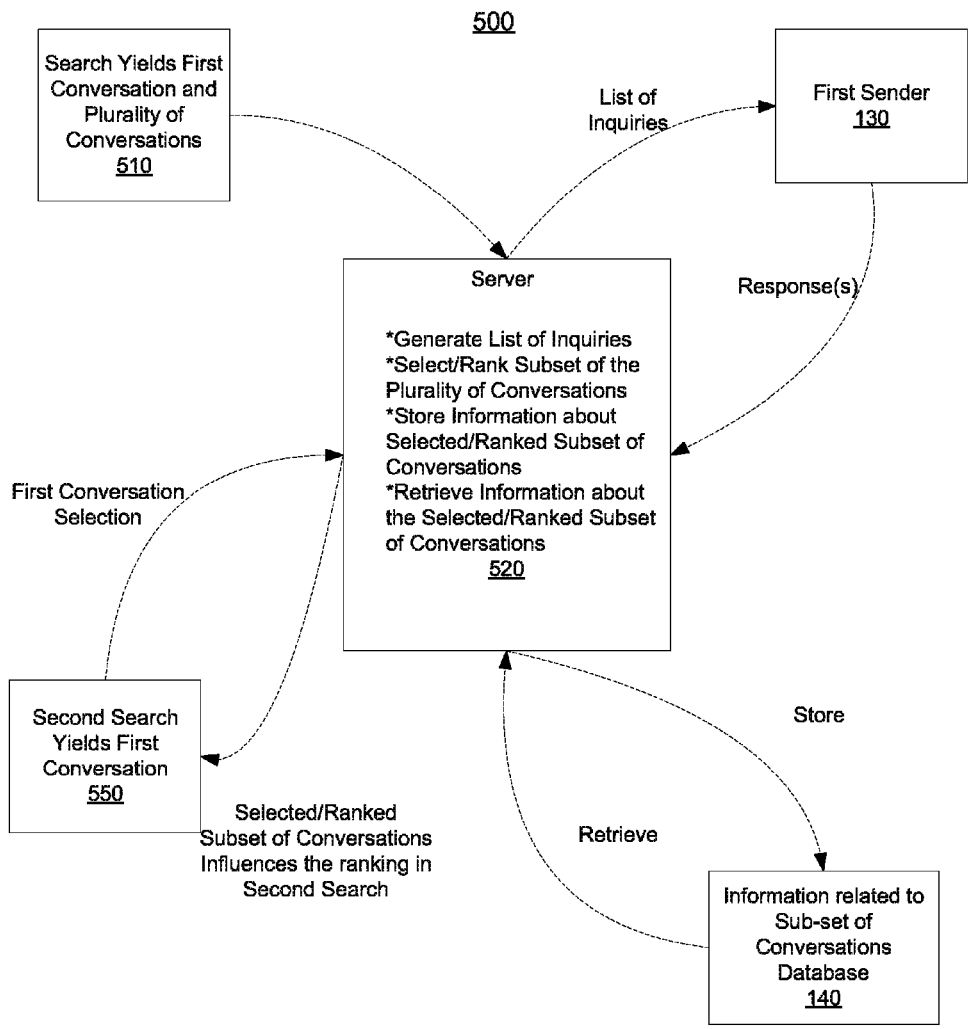
FIG. 5 is a block diagram of an embodiment of a system of providing related conversations here a sender provides input to selecting/ranking a subset of conversations, where a search yields a first file.

FIG. 5 is a block diagram of system 500, an embodiment of a system of providing related conversations, where a sender is involved in the selecting/ranking a subset of conversations, where a search yields a first file. Server 520 searches for a first file in the social network system of the enterprise. The search engine outputs a list of conversations 510 related to the first file based on search techniques described in conjunction with FIG. 1. Server 520 generates a list of inquiries based on the list of related conversations. The list of inquiries includes questions whether each of the conversations from search results are relevant to the first file.

The list of inquiries is notified to the sender of the conversation 130. A response is received from the sender. The response includes a selection of conversations related to the first file and optionally the reason for relevancy in the sender's opinion. In an embodiment, the response includes a ranked list of the related conversations, identifying the relevance of the related conversations to the first file. Server 520 ranks the related conversations based on the response from the sender. A subset of the ranked related conversations is selected. Server 520 stores information about the subset of selected/ranked conversations in a storage system 140. When a second search yields a plurality of search results containing the information identifying first file 550, server 520, retrieves the stored information about the subset of selected/ranked conversations and influences the ranking of the first file relative the search results when presenting the search results to the user. In one embodiment, the identity of the senders who selected each conversation is revealed to the user by displaying meta-data such as the sender's name, qualifications, institution, affiliation, address, or contact information.

Methods

Figure 6:
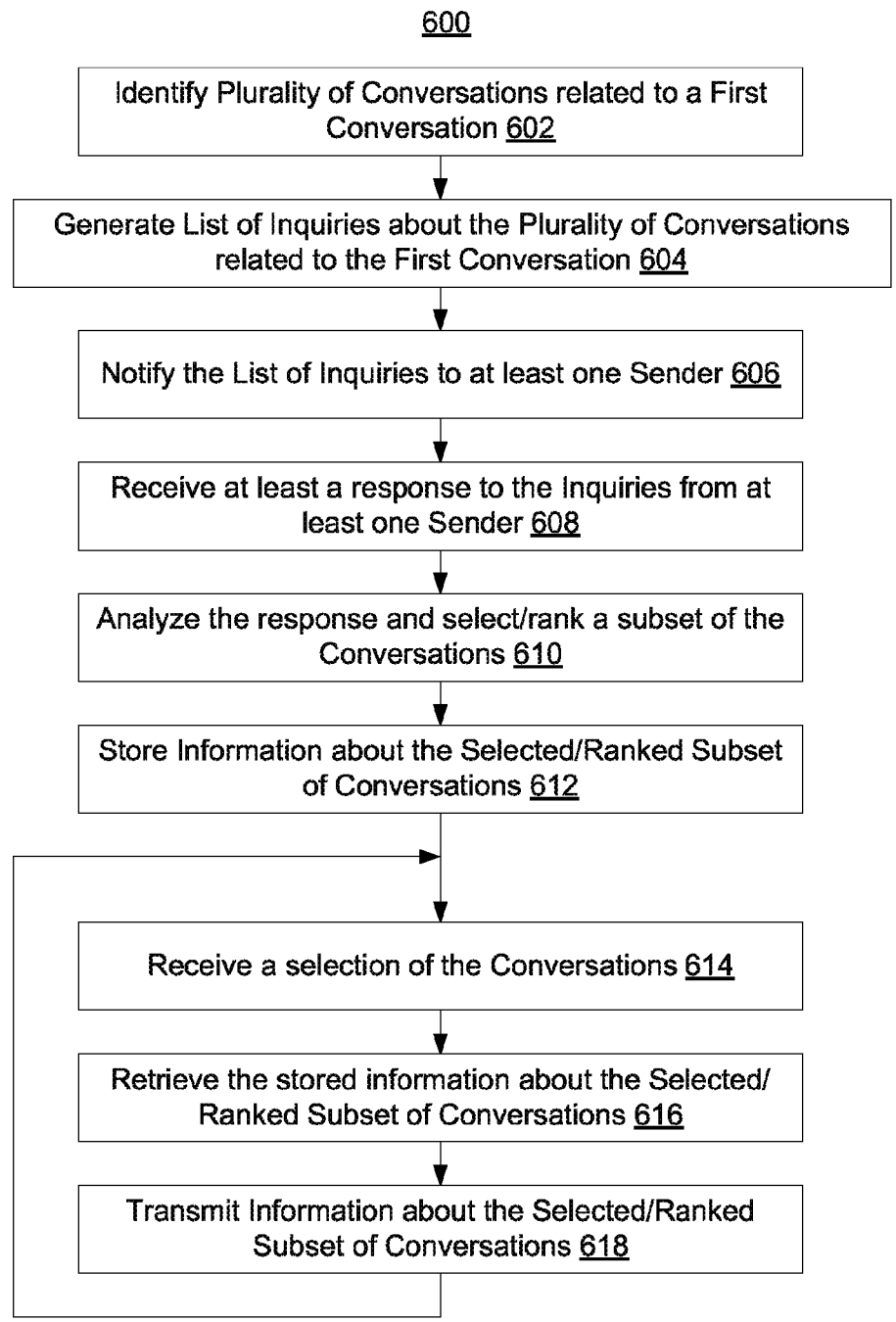
FIG. 6 is a flowchart that includes the steps of an example of a method of providing related conversations in a social network system, where one or more senders provide input to selecting/ranking a subset of conversations.

FIG. 6 is a flowchart that includes the steps of an example of a method of providing related conversations, where a sender is involved in the selecting/ranking a subset of conversations. In step 602, the social network system is searched to identify one or more conversations that are related to a first file. In an embodiment, the search is based on any of or all of natural language search, machine language search, text analysis, or collaborative filtering. In an embodiment, the social network system is searched for keywords that are automatically generated by the server. The keywords may be the sender/senders of the first file, frequently appearing words, senders of cited references in the first file, noun phrases based on subject matter, and subject. In an embodiment, the search is conducted on the full-text of the email. In another embodiment, only the headers and the subject are searched. In an embodiment, only conversations sent after the first file date sent are searched. In embodiment, the algorithm used to generate the search terms using Facebook Graph® API on Facebook® automatically extracts noun phrases from the first file using natural language processing tools and ranks them by the number of occurrences in the mail text compared to the number of occurrences on the web.

In step 604, the server automatically generates a list of inquires based on the search results of step 602 to access the relevancy of the search result. The list of inquiries includes questions about each related conversation. In an embodiment, inquiries list the subject of one or more conversations identified in the search, the date sent, and the search terms used to identify the conversation. Other embodiments may not list all the above items. FIG. 2 shows an example of the list of inquiries presented to senders. In step 606, the list of inquiries is notified to at least one sender of the first file. In one embodiment, the notification can be sent electronically by an email message, or a message on a social network or instant message. Web based interface is another method of notifying the sender.

In step 608, method 600 receives at least one response to the list of inquiries from the senders. The response includes a selection whether any of the conversations are relevant to the first file. If any of the conversations is relevant, a selection of the relevant conversation and optionally the reason for the conversation being relevant is presented. In an embodiment, the response includes a list of the related conversations, identifying the relevance of the related conversations to the first file. In step 610, method 600 analyzes the responses from the senders. The related conversations are ranked based on the number of selections received from the senders. A subset of the ranked related conversations is selected. In an embodiment, all conversations selected by the senders are selected. In another embodiment, a certain number of ranked conversations are selected. In another embodiment, conversations receiving certain rank are selected. Method 600 creates a hyperlink between the first file and the selected/ranked subset of conversations. The hyperlink can influence the search results in the social network system when the first file is involved. In step 612, information about the selected/ranked conversations related to the first file is stored. The information about the selected/ranked conversations includes at least one of hyperlinks to the conversations in the social network system, the rank of each conversation in the selected subset, metadata of the conversations. The information may be stored on the social network system or any other storage system.

Steps 602-612 are performed to generate a list of selected/ranked conversations that may be more relevant than the machine generated references. In an embodiment, steps 602-612 are performed once. In another embodiment, steps 602-612 are performed at certain fixed intervals. In another embodiment, events such as addition of a certain number of conversations or a manual intervention may trigger steps 602-612.

in step 614, method 600 receives a selection of the first file identifier or information about the first file from a user. The conversation or information about the conversation may be selected from search results or from a list of conversations. The server retrieves the stored information about the selected/ranked conversations in step 616. Information about the related conversations is displayed to the user in step 618 as shown in FIG. 2. In one embodiment, the identity of the senders who selected each conversation is revealed to the user by displaying meta-data such as the sender's name, qualifications, institution, affiliation, address, and contact information. Steps 614-618 are performed when a user selects the first file for display.

In an embodiment, each of the steps of method 600 may be a distinct step. In other embodiments, method 600 may not have all of the above steps and/or may have other steps in addition to or instead of those listed above. The steps of method 600 may be performed in another order. Subsets of the steps listed above as part of method 600 may be used to form their own method. In an embodiment, there could be multiple instances of method 600.

Figure 7:
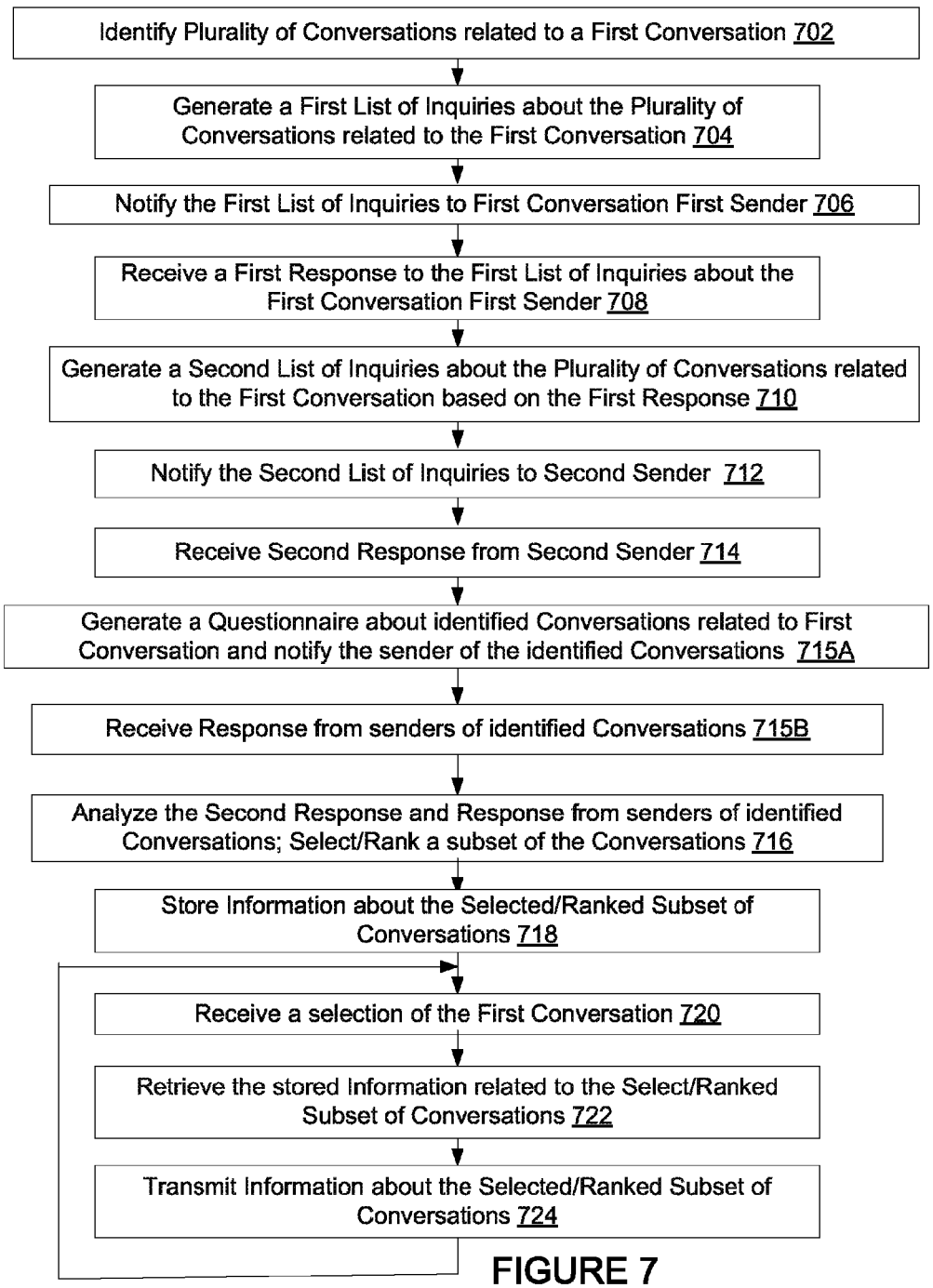
FIG. 7 is a flowchart that includes the steps of an example of a method of providing related conversations in a network, where more than one list of inquiries is generated and more than one sender is involved in the selecting/ranking, a subset of conversations.

FIG. 7 is an example of a flowchart that includes the steps of method 700 of providing a list of related conversations, where more than one list of inquiries is generated and more than one sender is involved in the selecting/ranking a subset of conversations. In this method, at least two distinct lists of inquiries are generated, the first list of inquiries is sent to the first sender and the second list of inquiries is sent to the other senders. The second list of inquiries is generated based on the response from the first sender.

In method 700, a set of one or more conversations related to a first file is identified in step 702. In step 704, a first list of inquiries about the set of conversations identified in step 702 is generated. The first list of inquiries includes questions whether each of the identified conversations are related to the first file and optionally why they are related. In the described embodiment, steps 702 and 704 are similar to steps 602 and 604 respectively. The first list of inquiries is notified to a first sender of the first file in step 706. A first response to the first list of inquiries is received in step 708. The response includes a selection of conversations related to the first file and optionally the reason for the selection. In step 710, a second list of inquires based on the response from the first sender about the relevance of the set of conversations to the first file is generated. In an embodiment, the second list of inquiries includes a list of conversations selected by the first sender for selecting conversations related to the first file. In an embodiment, the second list of inquires includes questions whether the second sender agrees with the first sender. In another embodiment, the second list of inquiries includes the reason for a conversation being relevant to the first file.

One or more second senders of the first file are notified with the second list of inquiries in step 712. In step 714, one or more second response is received from the second senders 451. In an embodiment, a questionnaire is generated based on the list of identified conversations in step 715A. The questionnaire includes whether the identified conversation is related to the first file. The questionnaire is notified to one or more senders of the plurality of identified conversations. In step 715B, server 420 receives response from one or more senders of the plurality of identified conversations.

In step 716, the second response from the second senders is analyzed. In an embodiment, conversations are ranked based on the number of selections from the second senders. In an embodiment, the response includes identifying the relevance of the related conversations to the first file. A subset of the ranked conversations is selected. In an embodiment, all conversations selected by the second senders are selected. In another embodiment, a certain number of ranked conversations or conversations with a certain rank are selected. Method 700 creates a hyperlink between the first file and the selected/ranked subset of conversations. The hyperlink can influence the search results in the social network system when the first file is involved. In step 718, information about the selected/ranked subset of conversations related to the first file is stored in a storage system.

Steps 702-718 are performed to generate a list of selected/ranked conversations that may be more relevant than the machine generated references. In an embodiment, steps 702-718 are performed once. In another embodiment, steps 702-718 are performed at certain fixed intervals. In another embodiment, events such as addition of a certain number of conversations or a manual intervention may trigger steps 702-718.

In step 720, the server receives a selection of the first file identifier. Information about the related conversations of the first file stored in a storage system is retrieved in step 722. Information about the list of related conversations is presented to the user in step 724. Steps 720-724 are performed when a user selects the first file for display. Steps 718, 720, 722, and 724 are similar to steps 612, 614, 616, and 618 respectively. In an embodiment, each of the steps of method 700 may be a distinct step. In other embodiments, method 700 may not have all of the above steps and/or may have other steps in addition to or instead of those listed above. The steps of method 700 may be performed in another order. Subsets of the steps listed above as part of method 700 may be used to form their own method. In an embodiment, there could be multiple instances of method 700.

Figure 8:
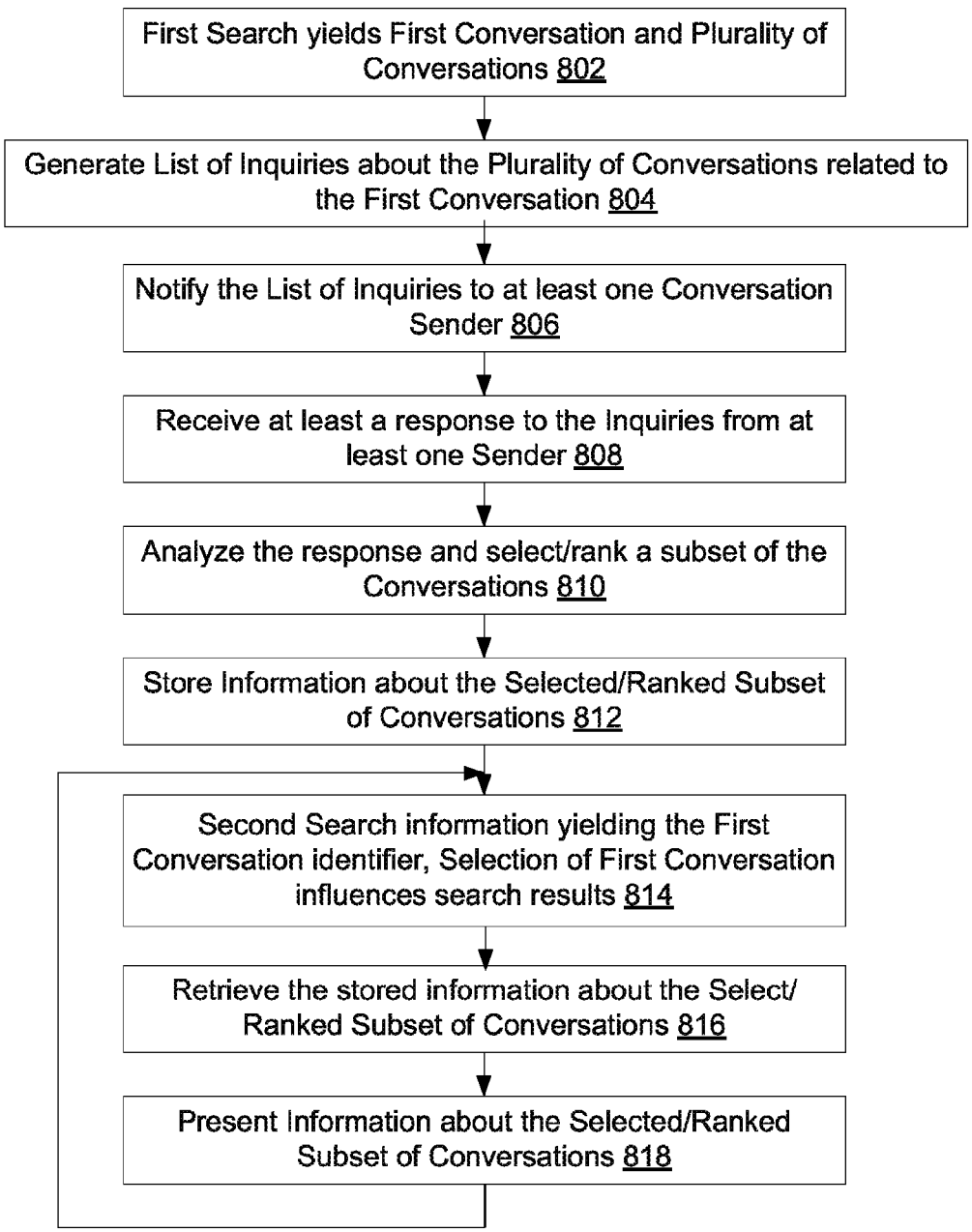
FIG. 8 is a flowchart of an example of a method of providing a list of related conversations, where a sender is involved in the selecting/ranking a subset of conversations, where a search yields a first file.

FIG. 8 is an example flowchart of method 800 of providing a list of related conversations where a sender provides input to selecting/ranking a subset of conversations, and a search yields a first file. A first search in the social network system using a search engine provides a list of conversations related to the first file. In an embodiment, the algorithm used to generate the search terms using Facebook Graph® API of Facebook® automatically extracts noun phrases from the first file using natural language processing tools and ranking them by the number of occurrences in the message text compared to the number of occurrences on the web.

A list of inquiries is generated based on the conversations related to the first file in step 804. The list of inquiries includes whether each conversation listed as related conversation from the search results is related to the first file and optionally the reason for being related. In step 806, the list of inquiries is notified to one or more senders. In step 808, method 800, receives at least one response from the senders providing information about the relevancy of related conversations to the first file and optionally the reason for a conversation being related the opinion of the sender. In step 810, the related conversations are ranked based on the number of selections from the senders. In an embodiment, the response includes a ranked list of the related conversations, identifying the relevance of the related conversations to the first file. A subset of the ranked conversations is selected. Information related to the subset of conversations is stored in a storage system in step 812. Method 800 creates a hype clink between the first file and the selected/ranked subset of conversations. The hyperlink can influence the search results in the social network system when the first file is involved. Steps 804, 806, 808, 810, and 812 may be similar to steps 604, 606, 608, 610 and 612.

Steps 802-812 are performed to generate a list of selected/ranked conversations that may be more relevant than the machine generated referenced. In an embodiment, steps 802-812 are performed once. In another embodiment, steps 802-812 are performed at certain fixed intervals. In another embodiment, events such as addition of a certain number of conversations or a manual intervention may trigger steps 802-812.

A second search in the social network system using a search engine yields a first file and the server receives a selection of the first file identifier in step 814. The selection of the first file can influence the search results of future searches. The server retrieves information about the related conversations (stored in step 812) from the storage system in step 816. In step 818, information about the related conversations is presented to the user. In one embodiment, the identity of the senders who selected each conversation is revealed to the user by displaying meta-data such as the sender's name, qualifications, institution, affiliation, address, or contact information. Steps 814, 816, and 818 may be similar to steps 614, 616 and 618. Steps 814, 816, and 818 are repeated for every search yielding the first file. In an embodiment, each of the steps of method 800 may be a distinct step. In other embodiments, method 800 may not have all of the above steps and/or may have other steps in addition to or instead of those listed above. The steps of method 800 may be performed in another order. Subsets of the steps listed above as part of method 800 may be used to form their own method. In an embodiment, there could be multiple instances of method 800.

Identifying Related Conversations

One or more conversations related to a first file in the social network system are identified by server 120 or server 320 or server 420. In the described embodiments, the first file can reside in a sender system 922, or in the social network system 920 or in server system 902. In several embodiments, the related conversations are identified by a natural language search, or text analysis, or from collaborative filtering, or any other search techniques. In an embodiment, server 120 or 320 or 420 extracts noun phrases from conversations in the social network system using natural language processing tools and ranks them by the number of occurrences in the conversation compared to the number of occurrences on the social network system. In one embodiment, server 520 searches the social network system using Facebook Graph® API to automatically extract noun phrases from conversations in Gmail using natural language processing tools and rank them by the number of occurrences in the conversation compared to the number of occurrences on the social network system. In an embodiment, hyperlink-validation is used to generate the list of related conversations.

Generation of List of Inquiries

In an embodiment, the list of inquiries generated by the system server includes one or more identified conversations related to a first file. In an embodiment, the inquiries include the search terms used in a search using text analysis or collaborative filtering. In another embodiment, the list of inquires includes one or more identified conversations and the noun-phrases from the first file used to identify the conversations. In an embodiment, the list of inquiries presented to the first sender includes one or more subjects of related of conversations, the search term used to identify the related conversations, the noun-phrases which are validated by their presence in the hyperlinks of the first file, the date sent. The list of inquiries for second senders is influenced by a response received from a first sender. The list of inquiries to second senders in includes one or more of the selection of related conversations by the first sender, the search terms used to identify the related conversation, the noun-phases used in hyperlink-validation techniques and the date sent. In an embodiment, a questionnaire is generated to the senders of the identified conversations. In an embodiment, the list of inquiries includes one or more of the types of relationship tags of the identified conversation such as whether the identified conversation summarizes the first file, contradicts the first file, or complements the first file. In an embodiment, the list of inquiries includes one or more of the types of relationship tags of the identified file such as whether the identified web pages summarizes the first file, contradicts the first file, or complements the first file. The questionnaire may contain questions whether the identified conversation is related to the first file. The list of inquires is notified electronically to one or more senders. The notification comprises at least one of an email message, messaging on a social network, instant message or a web-based interface notification.

Selection and Ranking of Related Conversations

The related conversations are ranked based on the number of selections from the senders. In an embodiment, a selection of the related conversation from each sender is ranked equally. In another embodiment, selection of a conversation from the first sender receives higher ranking. In another embodiment, selection of a conversation from a sender who responds to queries more often is ranked higher. In another embodiment, selection by the sender of the identified conversation is ranked higher. In another embodiment, selection of a conversation by the sender of the first file and sender of the second conversation is ranked highest. A subset of the related web pages is selected. In an embodiment, all conversations selected by the senders are selected. A subset of the related conversations is selected. In an embodiment, all conversations selected by the senders are selected. In another embodiment, a certain number of the ranked conversations are selected. In another embodiment, conversations receiving a certain rank are selected.

In an embodiment, a method of identifying conversations of a social network system having relevance to a first file, comprising: identifying a plurality of conversations within the social network system, wherein the plurality of conversations each have a relationship with the first file; generating, by a system server, a list of inquiries based on the plurality of conversations; providing, by the system server, the list of inquiries to at least one sender of the first file; receiving from the at least one sender at least one response to the list of inquiries; selecting a subset of the plurality of conversations based on the at least one response; storing information related to the selected subset of the plurality of conversations for access if the first file is select.

In an embodiment, the method generating, by the system server, a second list of inquiries based on the plurality of conversations; providing, by the system server, the second list of inquiries to at least one second sender of the plurality of conversations; receiving from the at least one second sender of the plurality of conversations at least one second response to the second list of inquiries; re-selecting the subset of the plurality of conversations based on the at least one response and the at least one second response; and storing information related to the re-selected subset of the plurality of conversations for access if the first file is selected. In an embodiment, a method further comprising providing, by the system server, the selected subset of the plurality of conversations to a user that selects the first file and identifying the at least one sender to the user. In an embodiment, a method wherein identifying the at least one sender comprises providing the user with the at least one sender's name, qualifications, institution, affiliation, address, or contact information. In an embodiment, a method comprising providing, by the system server, the selected subset of the plurality of conversations to a user that selects the first file and identifying the at least one sender of the first file, and the at least one sender of the plurality of conversations to the user, wherein identifying the at least one sender comprises providing the user with the at one of a name, qualifications, institution, affiliation, address, or contact information of the at least one sender. In an embodiment, a method comprising providing a hyperlink between the first file and the selected subset of the plurality of conversations, wherein the hyperlink influences a ranking of search results that include at least one of the first file and the plurality of conversations. In an embodiment, a method wherein the plurality of conversations are each identified by a plurality of subject-matter searches, wherein each search identifies one of the plurality of conversations and the first file. In an embodiment, a method wherein at least one of the plurality of subject-matter searches is refined by the at least one response.

In an embodiment, a method wherein at least one of the plurality of subject-matter searches uses a keyword search application programming interface to access conversations in the social network system. In an embodiment, a method wherein the list of inquiries includes search terms used in a search that identified the first file and the plurality of conversations, thereby establishing a relationship between the first file and the plurality of conversations by text analysis or collaborative filtering. In an embodiment, a method wherein the search terms comprise strings of words or noun phrases. In an embodiment, a method wherein the search terms comprise sender names cited by the first file. In an embodiment, a method wherein the search terms comprise a term within the first file. In an embodiment, a method where the search is based on at least one of a word string, a sender, or an image. In an embodiment, a method wherein the search terms are included within text of hyperlinks of the first file. In an embodiment, a method wherein each of the plurality of conversations includes a publication date, wherein each of the publication dates is more recent than at least one of a first revision or a last revision date of the first file.

In an embodiment, a method wherein each of the plurality of conversations includes a publication date, herein each of the publication dates is a specific date. In an embodiment, a method wherein each of the plurality of conversations includes a publication date, wherein each of the publication dates comprises a date before a specific date. In an embodiment, a method wherein the list of inquiries includes titles of at least a subset of the plurality of conversations. In an embodiment, a method wherein the list of inquiries includes senders of at least a subset of the plurality of conversations.

In an embodiment, a method wherein the at least one sender includes a first sender and a second sender, and wherein the list of inquiries for the first sender is influenced by a response received from the second sender. In an embodiment, a method wherein the list of inquiries includes a relationship tag between at least one of the plurality of conversations and the first file. In an embodiment, a method where in the relationship tag comprises at least one question of whether the relationship of the least one the plurality of conversations to the first file is supportive, contradictory or summarizing. In an embodiment, a method wherein providing the list of inquiries to the at least one sender of the first file comprises electronically communicating the list of inquires to the at least one sender using a notification. In an embodiment, a method wherein the notification comprises at least one of an email, messaging on a social network, or instant message. In an embodiment, a method wherein the notification comprises a web-based interface notification. In an embodiment, a method wherein receiving from the at least one sender at least one response to the list of inquiries comprises receiving a selected subset of the plurality of conversations that the at least one sender selects as being relevant to the first file.

In an embodiment, a method wherein receiving from the at lea one sender at least one response to the list of inquiries comprises receiving a ranked list of at least a subset of the plurality of conversations that identifies an order of relevance of the at least the subset of the plurality of conversations to the first file. In an embodiment, a method comprising providing the at least one inquiry based on one response to at least one other sender; receiving from the at least one other sender at least one second response to the at least one response; re-selecting the subset of the plurality of conversations based on the at least one second response; storing information related to the re-selected subset of the plurality of conversations for access if the first file is selected. In an embodiment, a method wherein the list of inquiries is provided to a plurality of senders, and responses received from each of the plurality of senders are compiled for selecting the subset of the plurality of conversations. In an embodiment, a method wherein a plurality of lists of inquiries are provided to a plurality of senders, and responses received from each of the plurality of senders are compiled for selecting the subset of the plurality of conversations.

In an embodiment, a method comprising the at least one sender having a permission to edit the first file. In an embodiment, a method for a server to identify conversations having relevance to a first file, comprising receiving, by the server, a plurality of conversations, wherein the plurality of conversations were generated by a subject matter search; generating, by the server, a list of inquiries based on the plurality of conversations; providing, by the server, the list of inquiries to a sender of the first wherein the first is a one of the plurality of conversations; receiving, by the server, from the sender at least one response to the list of inquiries; selecting, by the server, a subset of the plurality of conversations based on the at least one response; storing, by the server, the selected subset of the plurality of conversations for access if the first file is selected. In an embodiment, a method comprising providing, by the server, the selected subset of the plurality of conversations to a user that selects the first file. In an embodiment, a system for identifying conversations having relevance to a first comprising a server configured to present on a first display a list of inquiries to an identified sender of a first file, wherein the list of inquiries is based on a plurality of conversations; the server configured to receive from the identified sender at least one response to the list of inquiries; the server configured to select a subset of the plurality of conversations based on the at least one response; a server configured to present on a second display the selected subset of the plurality of conversations to a user that selects the first file. In an embodiment, a programmable storage device readable by a machine, tangibly embodying a program of instructions when executed by the machine to perform a method of identifying conversations of a social network system having relevance to a first file, the method comprising identifying a plurality of conversations within the social network system, wherein the plurality of conversations each have a relationship with the first file; generating, by a system server, a list of inquiries based on the plurality of conversations; providing, by the system server, the list of inquiries to at least one sender of the first file; receiving from the at least one sender at least one response to the list of inquiries; selecting a subset of the plurality of conversations based on the at least one response; storing information related to the selected subset of the plurality of conversations for access if the first file is selected. In an embodiment, a method of identifying conversations of a social network system having relevance to a first file, comprising identifying a plurality of conversations within the social network system, wherein the plurality of conversations each have a relationship with the first file; generating, by a system server, a first list of inquiries based on the plurality of conversations; providing, by the system server, the first list of inquiries to at least one sender of the first file; receiving from the at least one sender of the plurality of conversations at least one first response to the first list of inquiries; generating, by the system server, a second list of inquiries based on the plurality of conversations; providing, by the system server, the second list of inquiries to at least one second sender of the plurality of conversations; receiving from the at least one second sender of the plurality of conversations at least one second response to the second list of inquiries; selecting a subset of the plurality of conversations based on the at least one first response and the at least one second response; storing information related to the selected subset of the plurality of conversations for access if the first file is selected.

In an embodiment, a method wherein the information related to the selected subset of the plurality of conversations comprises an opinion of the at least one sender of either the first file or the plurality of conversations. In an embodiment a method comprises providing the opinion of the at least one sender to a user that selects the first file.

System

Figure 9:
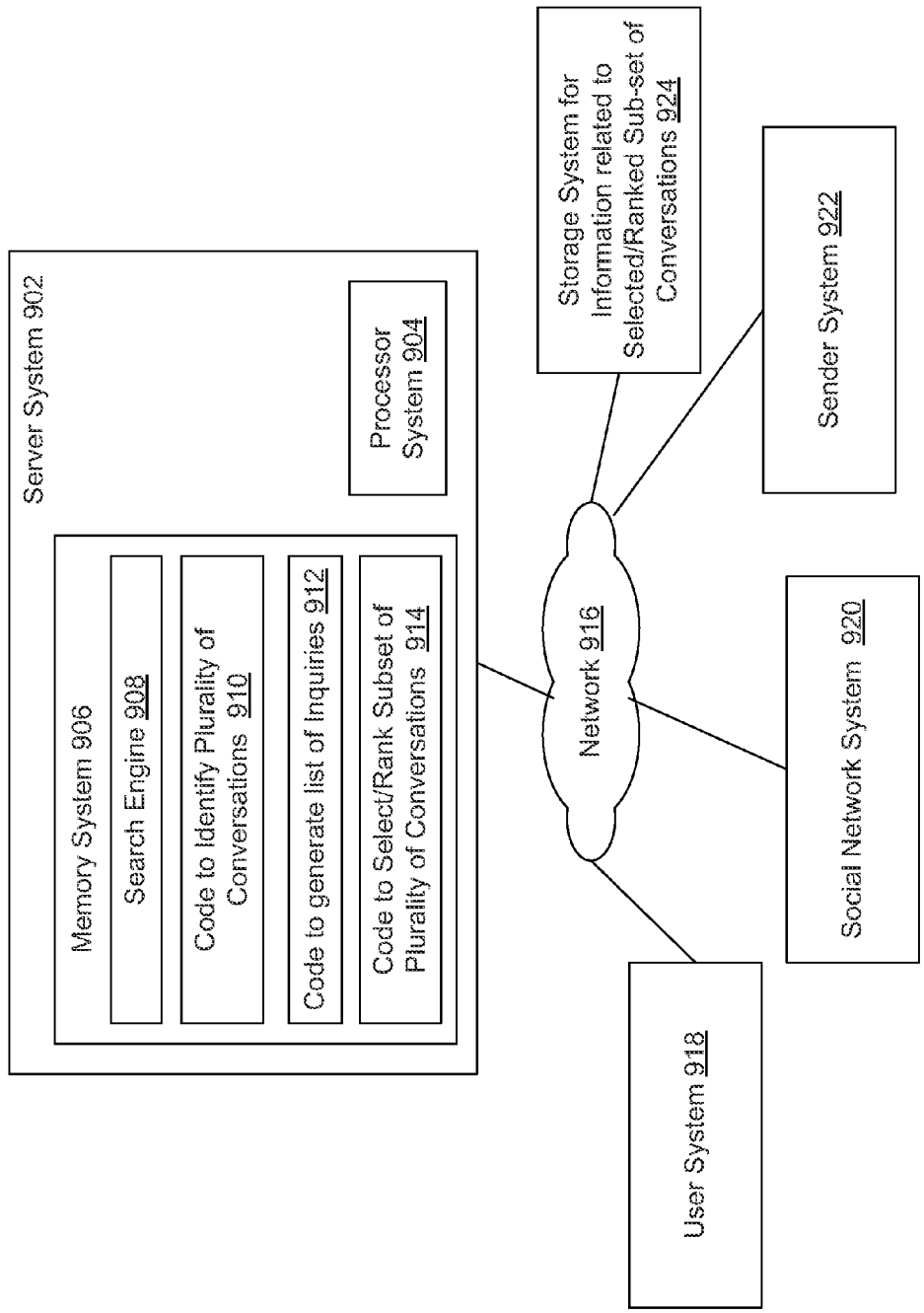
FIG. 9 shows an example of a block diagram of a system of providing related conversations to a search result in a social network system.

FIG. 9 shows a block diagram of system 900, an embodiment of a system of providing related conversations to a search result. The system consists of server system 902, network 916, user system 918, social network system 920, sender system 922, and storage system for information related to selected/ranked subset of conversations 924 among others. In other embodiments, system 900 may not have all of the elements or features listed and/or may have other elements or features instead of or in addition to those listed.

As shown in FIG. 9, for the described embodiments, server system 902 includes processor system 904 and memory system 906 among others. Server system 902 consists of on one or more servers connected to the network. Server system 902 can be a single unit, distributed in various locations, or virtualized. Processor system 904 may include any one of, some of, any combination of, or all of multiple parallel processors, a single processor, a system of processors having one or more central processors and/or one or more specialized processors dedicated to specific tasks. Also, processor system 904 may include one or more Digital Signal Processors (DSPs) in addition to or in place of one or more Central Processing Units (CPUs) and/or may have one or more digital signal processing programs that run on one or more CPU.

Memory system 906 may include, for example, any one of, some of, any combination of, or all of a tong-term storage system, such as a hard drive; a short-term storage system, such as random access memory; a removable storage system, such as a floppy drive or a removable drive; and/or flash memory. Memory system 906 may include one or more machine-readable mediums that may store a variety of different types of information. The term machine-readable medium is used to refer to any medium capable carrying information that is readable by a machine. One example of a machine-readable medium is a computer-readable medium.

In an embodiment, memory system 906 stores code for search engine 908, code to identify plurality of conversations 910, code to generate a list of inquiries and questionnaire 912, and code to select/rank subset of plurality of conversations 914. Memory system 906 stores code for the search engine 906 to search the social network system for conversations related to a first file and returns the result to server system 902. In the described embodiments, the first file can reside in the social network system 920, or sender system 922, or storage system for information related to selected/ranked subset of conversations 924 or memory system 906 or any other storage system. In an embodiment, the search engine searches the subject heading of conversations. In another embodiment, the search engine searches the entire conversation for keywords. The results from the search engine are ranked in order of relevancy. The relevancy may be the number of times the keyword appears in the conversation, and the number of hyperlinks.

The keywords for searching related conversations are supplied by the code to identify plurality of conversations 910. The keywords my be all of or some of frequently used noun phrases, the sender of the first file, the senders listed in the references cited in the first file, words from the subject, date sent, words related to subject matter. Once the server receives the list of conversations related to the first file, an inquiry is automatically generated by code to generate a list of inquiries 912 and sent to one or more senders. The list of inquiries is based on the search results. The inquiries include the relevancy of each of conversations listed as a related conversation to the first file, the reason for the conversation being related to the first file. Code to select/rank subset of plurality of conversations 914, selects a subset of the conversations from search results, stores information about the selected subset of conversations, and provides a hyperlink between the first file and the selected subset of conversations. Selection of conversations may also include ranking the conversations based on the number of selection from the senders. In an embodiment, responses from different senders can have different weight. Information related to the selected/ranked subset of conversations is stored. In an embodiment, the information related to the selected/ranked subset of conversations is stored on a storage system for information related to selected/ranked subset of conversations 924. In another embodiment, the information related to the selected/ranked subset of conversations is stored in memory system 906. In another embodiment, the information related to the selected/ranked subset of conversations is stored in the social network system. In an embodiment, a hyperlink is created between the first file and the selected subset of conversations. The hyperlink influences the ranking of search results by the search engine when the first file is involved.

Network 916 is a network and/or combination of networks of devices that communicate with one another within an enterprise or on the Internet. User system 918 is a user device connected to the network 916. User system 918 selects a conversation from the social network system. The conversation is selected from a search result or from a listing of conversations. Social network system 920 is a shared storage system. All users can access the social network system to read and in some cases contribute to the social network system. Sender system 922 is a user system in the network. The sender system has read and write access to conversations in the social network system. A sender of a conversation may be a sender of the first message in the conversation, sender of any message, an expert in the subject matter or a team member.

An embodiment includes a programmable storage device (such as memory 906) readable by a machine such a processor system 904), tangibly embodying a program of instructions when executed by the machine to perform a method of identifying conversations of a social network system having relevance to a first file. The method includes identifying a plurality of conversations within the social network system, wherein the plurality of conversations each have a relationship with the first file, wherein the social network system provides a platform for storing and sharing conversation, and each conversation includes a conversation and associated information. The method further includes generating, by a system server, a list of inquiries based on the plurality of conversations, providing, by the system server, the list of inquiries to at least one sender of the first file, receiving from the at least one sender at least one response to the list of inquiries, selecting a subset of the plurality of conversations based on the at least one response, storing information related to the selected subset of the plurality of conversations for access if the first file is selected.

Although specific embodiments have been described and illustrated, the described embodiments are not to be limited to the specific forms or arrangements of parts so described and illustrated.

The invention claimed is:

1. A method of identifying conversations of a social network system having relevance to a first file, comprising:
   identifying a plurality of conversations within the social network system, wherein the plurality of conversations each have a relationship with the first file, wherein the social network system provides a platform for storing and sharing conversation, and each conversation includes a conversation and associated information;
   generating, by a system server, a list of inquiries based on the plurality of conversations, wherein the list of inquiries includes search terms used in a search that identified the first file and the plurality of conversations, thereby establishing the relationship between the first file and the plurality of conversations by text analysis or filtering;
   providing, by the system server, the list of inquiries to at least one sender of the first file, wherein the sender is provided with write-privilege to the first file;
   receiving from the at least one sender at least one response to the list of inquiries;
   selecting a subset of the plurality of conversations based on the at least one response;
   storing information related to the selected subset of the plurality of conversations for access if the first file is selected;
   providing, by the system server, the selected subset of the plurality of conversations to a user that selects the first file; and
   identifying the at least one sender to the user.

2. The method of claim 1, further comprising:
   generating, by the system server, a second list of inquiries based on the plurality of conversations;
   providing, by the system server, the second list of inquiries to at least one second sender of the plurality of conversations;
   receiving from the at least one second sender of the plurality of conversations at least one second response to the second list of inquiries;
   re-selecting the subset of the plurality of conversations based on the at least one response and the at least one second response; and
   storing information related to the re-selected subset of the plurality of conversations for access if the first file is selected.

3. The method of claim 1, wherein identifying the at least one sender comprises providing the user with the at least one sender's name, qualifications, institution, affiliation, address, or contact information of the at least one sender.

4. The method of claim 1,
   wherein identifying the at least one sender comprises providing the user with a name, qualifications, institution, affiliation, address, or contact information of the at least one sender.

5. The method of claim 1, further comprising providing a hyperlink between the first file and the selected subset of the plurality of conversations, wherein the hyperlink influences a ranking of search results that include at least one of the first file and the plurality of conversations.

6. The method of claim 1, wherein the plurality of conversations are each identified by a plurality of subject-matter searches, wherein each search identifies one of the plurality of conversations and the first file.

7. The method of claim 6, wherein at least one of the plurality of subject-matter searches is refined by the at least one response.

8. The method of claim 7, wherein at least one of the plurality of subject-matter searches uses a keyword search application programming interface to access conversations in the social network system.

9. The method of claim 1, wherein the search terms comprise strings of words.

10. The method of claim 1, wherein the search terms comprise noun phrases.

11. The method of claim 1, wherein the search terms comprise sender names cited by the first file.

12. The method of claim 1, wherein the search terms comprise a term within the first file.

13. The method of claim 1, wherein the search is based on at least one of a word string, a sender, or an image.

14. The method of claim 1, wherein the search terms are included within text of hyperlinks of the first file.

15. The method of claim 1, wherein each of the plurality of conversations includes a publication date, wherein each of the publication dates is more recent than at least one of a first revision or a last revision date of the first file.

16. The method of claim 1, wherein each of the plurality of conversations includes a publication date, wherein each of the publication dates is a specific date.

17. The method of claim 1, wherein each of the plurality of conversations includes a publication date, wherein each of the publication dates comprises a date before a specific date.

18. The method of claim 1, wherein the list of inquiries includes titles of at least a subset of the plurality of conversations.

19. The method of claim 1, wherein the list of inquiries includes senders of at least a subset of the plurality of conversations.

20. The method of claim 1, wherein the at least one sender includes a first sender and a second sender, and wherein the list of inquiries for the first sender is influenced by a response received from the second sender.

21. The method of claim 1, wherein the list of inquiries includes a relationship tag between at least one of the plurality of conversations and the first file.

22. The method of claim 21, where in the relationship tag comprises at least one question of whether the relationship of the at least one the plurality of conversations to the first file is supportive, contradictory or summarizing.

23. The method of claim 1, wherein providing the list of inquiries to the at least one sender of the first file comprises electronically communicating the list of inquires to the at least one sender using a notification.

24. The method of claim 23, wherein the notification comprises at least one of an email, messaging on a social network, or instant message.

25. The method of claim 23, wherein the notification comprises a web-based interface notification.

26. The method of claim 1, wherein receiving from the at least one sender at least one response to the list of inquiries comprises receiving a selected subset of the plurality of conversations that the at least one sender selects as being relevant to the first file.

27. The method of claim 1, wherein receiving from the at least one sender at least one response to the list of inquiries comprises receiving a ranked list of at least a subset of the plurality of conversations that identifies an order of relevance of the at least the subset of the plurality of conversations to the first file.

28. The method of claim 1, further comprising:
providing the at least one inquiry based on one response to at least one other sender;
receiving from the at least one other sender at least one second response to the at least one response;
re-selecting the subset of the plurality of conversations based on the at least one second response; and
storing information related to the re-selected subset of the plurality of conversations for access if the first file is selected.

29. The method of claim 1, wherein the list of inquiries is provided to a plurality of senders, and responses received from each of the plurality of senders are compiled for selecting the subset of the plurality of conversations.

30. The method of claim 1, wherein a plurality of lists of inquiries are provided to a plurality of senders, and responses received from each of the plurality of senders are compiled for selecting the subset of the plurality of conversations.

31. The method of claim 1, further comprising the at least one sender having a permission to edit the first file.

32. A method for a server to identify conversations having relevance to a first file, comprising:
receiving, by the server, a plurality of conversations, wherein the plurality of conversations were generated by a subject matter search;
generating, by the server, a list of inquiries based on the plurality of conversations, wherein the list of inquiries includes search terms used in a search that identified the first file and the plurality of conversations, thereby establishing the relationship between the first file and the plurality of conversations by text analysis or filtering;
providing, by the system server, the list of inquiries to at least one sender of the first file, wherein the sender is provided with write-privilege to the first file;
receiving from the at least one sender at least one response to the list of inquiries;
selecting a subset of the plurality of conversations based on the at least one response;
storing information related to the selected subset of the plurality of conversations for access if the first file is selected;
providing, by the system server, the selected subset of the plurality of conversations to a user that selects the first file; and
identifying the at least one sender to the user.

33. The method of claim 32, further comprising providing, by the server, the selected subset of the plurality of conversations to a user that selects the first file.

34. A system for identifying conversations having relevance to a first file, comprising:
a server configured to present on a first display a list of inquiries to an identified sender of a first file, wherein the sender is provided with write-privilege to the first file, wherein the list of inquiries is based on a plurality of conversations, wherein the list of inquiries includes search terms used in a search that identified the first file and the plurality of conversations, thereby establishing the relationship between the first file and the plurality of conversations by text analysis or filtering;
the server configured to receive from the identified sender at least one response to the list of inquiries;
the server configured to select a subset of the plurality of conversations based on the at least one response;
a server configured to present on a second display the selected subset of the plurality of conversations to a user that selects the first file, and identify the at least one sender to the user.

35. A programmable storage device readable by a machine, tangibly embodying a non-transitory program of instructions when executed by the machine to perform a method of identifying conversations of a social network system having relevance to a first file, the method comprising:
identifying a plurality of conversations within the social network system, wherein the plurality of conversations each have a relationship with the first file, wherein the social network system provides a platform for storing and sharing conversation, and each conversation includes a conversation and associated information;
generating, by a system server, a list of inquiries based on the plurality of conversations, wherein the list of inquiries includes search terms used in a search that identified the first file and the plurality of conversations, thereby establishing the relationship between the first file and the plurality of conversations by text analysis or filtering;
providing, by the system server, the list of inquiries to at least one sender of the first file, wherein the sender is provided with write-privilege to the first file;
receiving from the at least one sender at least one response to the list of inquiries;
selecting a subset of the plurality of conversations based on the at least one response;
storing information related to the selected subset of the plurality of conversations for access if the first file is selected;
providing, by the system server, the selected subset of the plurality of conversations to a user that selects the first file; and
identifying the at least one sender to the user.

36. A method of identifying conversations of a social network system having relevance to a first file, comprising:
identifying a plurality of conversations within the social network system, wherein the plurality of conversations each have a relationship with the first file, wherein the social network system provides a platform for storing and sharing conversation, and each conversation includes a conversation and associated information;
generating, by a system server, a first list of inquiries based on the plurality of conversations, wherein the list of inquiries includes search terms used in a search that identified the first file and the plurality of conversations, thereby establishing the relationship between the first file and the plurality of conversations by text analysis or filtering;
providing, by the system server, the first list of inquiries to at least one sender of the first file, wherein the sender is provided with write-privilege to the first file;
receiving from the at least one sender of the plurality of conversations at least one first response to the first list of inquiries;
generating, by the system server, a second list of inquiries based on the plurality of conversations;
providing, by the system server, the second list of inquiries to at least one second sender of the first file, wherein the second sender is provided with write-privilege to the first file;
receiving from the at least one second sender at least one second response to the second list of inquiries;

selecting a subset of the plurality of conversations based on the at least one response and the at least one second response;

storing information related to the selected subset of the plurality of conversations for access if the first file is selected;

providing, by the system server, the selected subset of the plurality of conversations to a user that selects the first file; and identifying the at least one sender and the at least one second sender to the user.

37. The method of claim 36, wherein the information related to the selected subset of the plurality of conversations comprises an opinion of the at least one sender of either the first file or the plurality of conversations.

38. The method of claim 36, further comprises providing the opinion of the at least one sender to a user that selects the first file.

\* \* \* \* \*